March 2, 1954

W. M. DUNCAN 2,670,947

APPARATUS FOR SINTERING MACHINES

Original Filed June 19, 1947

INVENTOR:
WILLIAM M. DUNCAN

BY
ATTORNEYS.

March 2, 1954 W. M. DUNCAN 2,670,947
APPARATUS FOR SINTERING MACHINES
Original Filed June 19, 1947 3 Sheets-Sheet 2

INVENTOR:
WILLIAM M. DUNCAN
BY Bruninga and Sutherland
ATTORNEYS.

March 2, 1954 W. M. DUNCAN 2,670,947
APPARATUS FOR SINTERING MACHINES
Original Filed June 19, 1947 3 Sheets-Sheet 3

INVENTOR:
WILLIAM M. DUNCAN
BY Bruinga and Sutherland
ATTORNEYS.

Patented Mar. 2, 1954

2,670,947

UNITED STATES PATENT OFFICE 2,670,947

APPARATUS FOR SINTERING MACHINES

William M. Duncan, Alton, Ill., assignor to Duncan Foundry and Machine Works, Inc., Alton, Ill., a corporation of Illinois Original application June 19, 1947, Serial No. 755,770. Divided and this application July 7, 1950, Serial No. 172,495

3 Claims. (Cl. 266—21)

This invention relates generally to apparatus for sintering machines, and particularly to the removal and replacement of pallets in sintering machines. This application is a division of my prior co-pending application, now Patent No. 2,519,179.

In my prior application, above identified, there is disclosed a sintering machine wherein a pair of parallel strands of pallets are moved about their respective paths in unison, and the duct work leading to the wind boxes for the respective strands of pallets arranged between the two strands so as to leave considerable free space between the upper and lower reaches of each strand. The space thus left is that which is ordinarily occupied by the wind boxing arrangement and the duct work. With such machines, wherein the wind boxing and duct work occupies the space between the strands, considerable difficulty is experienced when it is desired to exchange pallets, as for example, when one becomes deteriorated and it is desired to replace it. In the sintering machines of the prior art, it was generally necessary to interrupt operation of the machine in order to replace a defective pallet.

The object of the present invention, generally stated, is to provide an apparatus for facilitating the exchange of pallets in a sintering machine.

A further object of the invention is to provide such a pallet exchange apparatus which may be operated without interrupting the operation of the sintering machine.

Other objects will become apparent to those skilled in the art when the following description is read in connection with the accompanying drawings, in which.

The present invention contemplates that, in a sintering machine of the character mentioned, the duct work leading to the usual wind boxes be arranged at one side of the pallet strand, so as to leave a substantial amount of open space between the upper and lower reaches of the pallet strand. Within the space thus left vacant, the invention contemplates the provision of a pallet transfer mechanism, which includes a trolley rail suspended within the space aforesaid and leading outwardly beyond the confines of the sintering machine. Upon the trolley rail a suitable ambulatory hoist is mounted, so that it may elevate a pallet from the lower reach of the pallet strand, and remove it to a position remote from the sintering machine, and pick up pallets at a position remote from the sintering machine and transfer them to positions in the machine. In order to facilitate the transfer of pallets without interrupting the continuous operation of the sintering machine, the invention also contemplates the provision of a suitable retarding device, such as a brake, for operating upon the pallet strand in advance of the position where the hoist operates upon an individual pallet.

Figure 1:
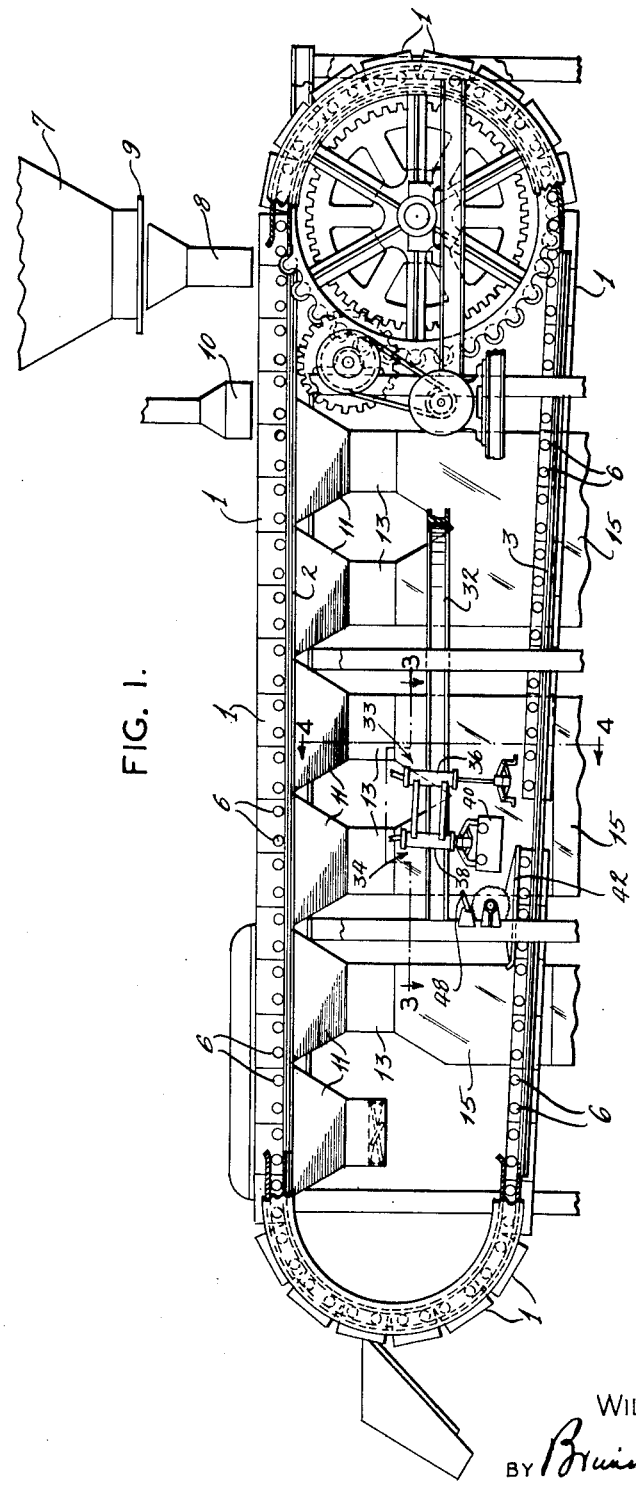
Figure 1 is a view in side elevation of a sintering machine equipped with the pallet exchange devices of the present invention.

Referring now to Figure 1 of the drawings, a succession of pallets 1 is mounted upon a stationary endless track having an upper reach 2, which is substantially horizontal, and an inclined lower reach 3. The present invention contemplates that the pallets 1 be preferably not over six feet long and not over twenty-four inches wide. The pallets 1 are otherwise constructed in accordance with the usual practice having a grated bottom.

The pallets 1 are provided with trunnions 6 which extend from each end thereof for engagement with the endless track. Along the reaches 2 and 3, the flanges of the track extend only beneath the trunnions 6.

In accordance with the usual practice, the trunnions 6 may be provided with rollers.

As in any such sintering machine, a feed bin 7 is mounted above the endless track for the pallets near one end thereof and is provided with a swinging spout 8 (of the conventional type) and a suitable control valve 9.

Adjacent the feed bin 7 a suitable ignition furnace 10 is provided for igniting the mixture of ore and fuel with which the respective pallets are laden.

Arranged below the upper reach of the track 2 and extending from a position directly beneath the ignition furnace 10 toward the discharge end of the machine is a plurality of wind boxes 11, each arranged in accordance with the usual practice to extend as close as practicable to the bottoms of the several pallets 1 as the latter traverse their endless path.

To draw the combustion gases from the wind boxes 11 with air, an arrangement of duct work consisting of a vertical leg 15 and an inclined branch 13, one for each wind box, is provided and arranged so that the vertical leg 15 passes upwardly adjacent the side (being the side opposite that shown in Figure 1) of the lower reach of the strand of pallets. The duct 15 leads to a suitable dust collector and blower, arranged as shown in my co-pending application above identified, or otherwise as desired. The present invention particularly contemplates that a substantial space between the upper and lower reaches of pallets be devoid of ducts or other mechanism which would interfere with the provision and operation of the transfer mechanism, now to be described.

Figure 3:
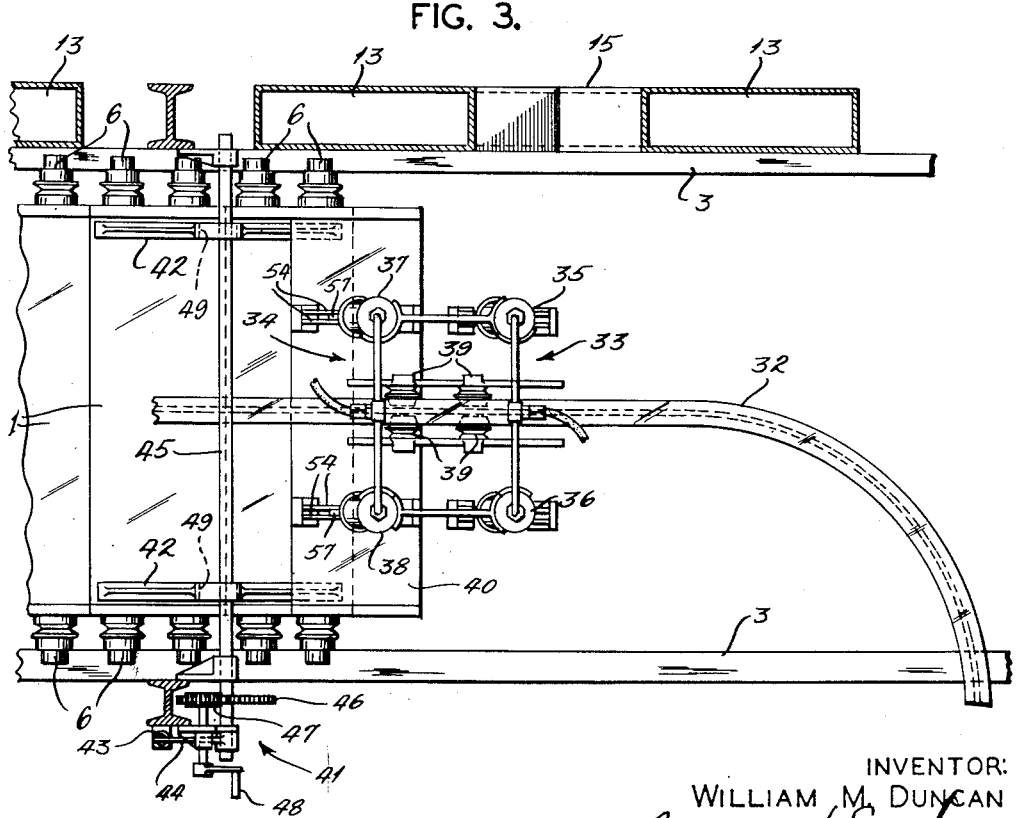
Figure 3 is a sectional view taken along line 3—3 of Figure 1.
Figure 4:
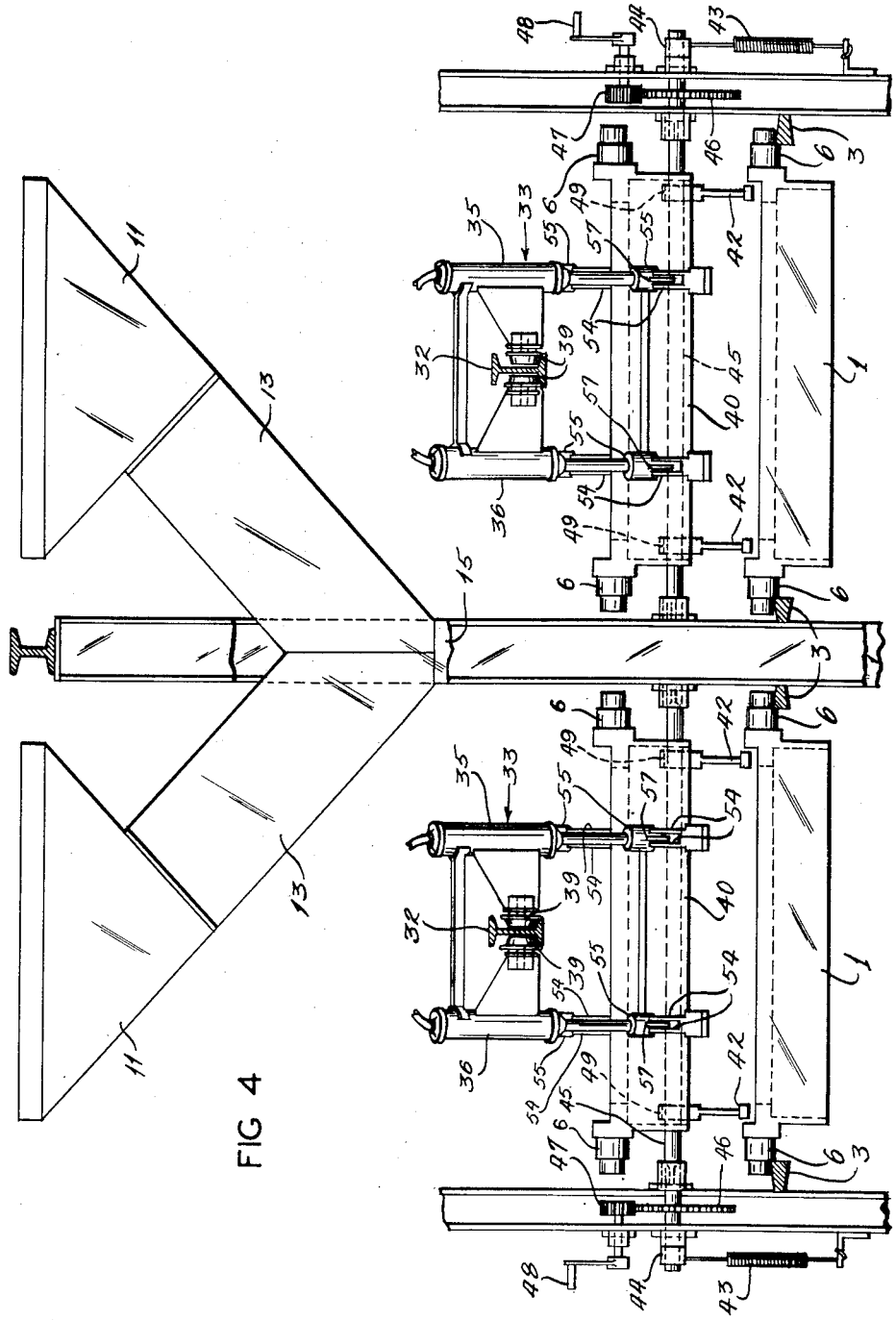
Figure 4 is a sectional view taken along line 4—4 of Figure 1.

In order to facilitate the removal and replacement of pallets having burned out grate bars, without interrupting the operation of the sintering machine, the present invention contemplates the provision of a lift and transfer mechanism between the upper and lower reaches of the endless path for the pallets. In the space which, in accordance with the prior practice, has been occupied by the ducts leading from the wind boxes the present invention contemplates the provision of an over-head rail or trolley 32, which is mounted so as to extend substantially horizontally between the upper and lower reaches of the pallet series. For a substantial distance between the upper and lower reaches of the pallet series, the trolley 32 extends in a direction parallel to the length of the sintering machine, but toward the drive sprockets the trolley curves, as shown clearly in Figure 3, so as to extend to the exterior of the sintering machine.

Mounted upon the trolley 32 is a pair of dual hoists 33 and 34. The hoists 33 and 34 may be identical and each is preferably provided with two lifting mechanisms interlocked so as to operate together. For example, in the embodiment shown, the mechanisms are compressed-air-operated and the hoist 33 is provided with two air cylinders 35 and 36, one on each side of the trolley 32. Likewise, the hoist 34 is provided with two air cylinders 37 and 38, one on each side of the trolley 32. Cylinders 35 and 36 work together but entirely separate from cylinders 37 and 38, which latter work together.

Figure 2:
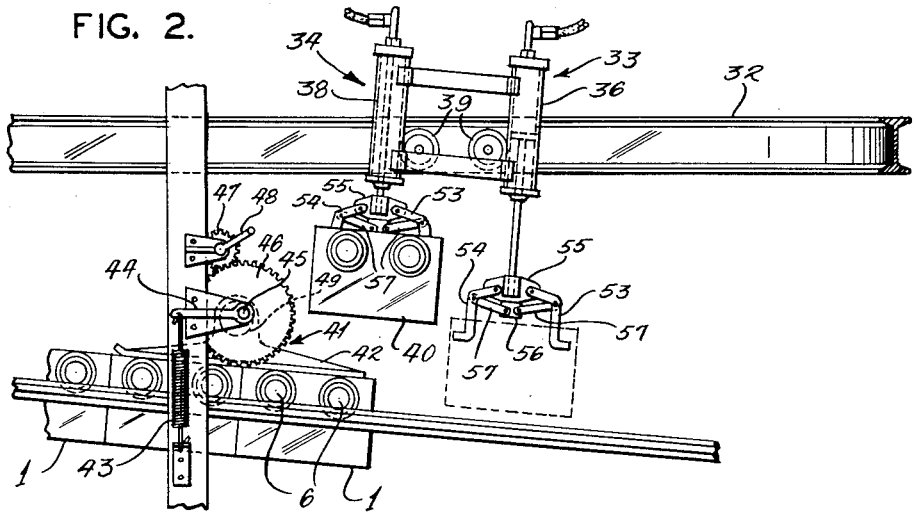
Figure 2 is an enlarged view of a portion of Figure 1, showing the pallet transfer mechanism in greater detail.

In the embodiment shown the hoist 33 (consisting of two cylinders 35 and 36) and the hoist 34 (consisting of two cylinders 37 and 38) are mounted upon the same carriage to provide a unitary transfer mechanism, which is mounted upon wheels 39 entracked upon trolley 32. The several cylinders are mounted, with relation to the trolley rail, so that their lifting force is exerted in a direction substantially perpendicular to the lower reach of track 3, which is inclined as shown clearly in Figure 2.

With such an apparatus the removal and replacement of a pallet from the series may be accomplished with facility and speed. From outwardly beyond the confines of the sintering machine, the transfer mechanism may be moved with hoist 34, laden with a new pallet 40, suspended upside-down ready to be dropped into position in the series of pallets when one is removed. When the transfer mechanism is moved to the interior of the sintering machine, bearing a new pallet 40 as just described, it is contemplated that the hoist 33 be unloaded. When the pallet which it is desired to remove from the machine reaches a position beneath the hoist 33, said pallet is engaged by the hoist, lifted out of position in the series, and then, while the removed pallet is still suspended by hoist 33, hoist 34 is lowered to deposit pallet 40 in position in the series.

Between the operation of the two hoists 33 and 34, as just described, sufficient time may elapse that one or more pallets have passed the locus of operation so that the new pallet may not be in the exact position relative to the other pallets as was the removed pallet, but such is immaterial. Moreover, by providing the trolley rail 32 so that it lies in a vertical plane parallel with the plane of track 3 for a substantial distance, it is evident that the pallet, after being engaged by the hoist, may continue to move down the incline as the hoist is free to move along its trolley rail in a parallel direction for a substantial distance.

In order to retard the movement of the succession of pallets past the locus at which the interchange just described is being made, the invention further contemplates the provision of a brake 41 having a shoe 42 adapted to frictionally engage the bottom surface of the pallets as they traverse a position immediately in advance of the locus at which the interchange is being made. The brake 41 is not a positive brake, which would require interruption of the machine, but is preferably an impositive brake which, while retarding the movement of pallets along the lower reach of the machine, will, nonetheless, permit the machine to continue in operation. In the embodiment shown in the drawings, the brake 41 is provided with a spring 43 tending to hold shoe 42 in engagement with the pallets. The spring 43 operates through a lever 44 secured as a crank upon a shaft 45. The shaft 45 is also provided with a gear 46 driven by a pinion 47 from a crank 48 so as to facilitate the movement of lever 44 from the position shown in Figure 2 to an opposite position, where the tension of spring 43 will tend to rotate lever 44 in the opposite sense. Upon the extremity of shaft 45, an eccentric 49 is provided and upon said eccentric the brake shoe 42 is carried. With such an organization of parts, it is apparent that, when the parts are in the position shown in Figure 2, the spring 43 tends to move the shoe 42 so as to grip and retard the movement of the pallets, but, under normal operating conditions, the parts will assume a position wherein lever 44 extends in a nearly opposite direction to that shown in the drawings. In the latter position, the tension of spring 43 will tend to maintain the shoe 42 out of engagement with the pallets. While the brake 41 is primarily intended for retarding the movement of the pallets along the inclined lower reach of their path during interchange, such a brake may nonetheless be continuously employed, and in fact a plurality thereof may be provided along the lower reach of the pallet path, so as to retard the movement of the pallets thereon, especially when the path may be incompletely filled with pallets.

With the transfer mechanism of the character above described, a replacement pallet may be moved into position and the pallet, being replaced, taken from the sintering machine and deposited beyond the confines thereof with but one maneuver of the transfer mechanism along its track 32, it being understood that, somewhere in a convenient location beyond the confines of the sintering machine, there will exist a supply of replacement pallets and a point for disposing of the pallets to be reconditioned, both of which will be served by trolley 32.

In order that the hoists 33 and 34 may readily engage the pallets, the hoists are provided with a set of toggle hooks 53 and 54, the upper ends of which are pivoted on a collar 55, which is slidably mounted on the rod extending from the piston within each of cylinders 35—36 and 37—38, as the case may be. The lower end of the piston rod is secured to a head 56. A pair of links 57 extend between head 56 and toggle hooks 54. The toggle hooks 54 have their lower extremities proportioned to pass between the bars which constitute the grated bottom of the several pallets and engage projections therein located, it being understood that during the transfer operation the pallets are upside down.

While one complete embodiment has been disclosed in detail, various modifications and alterations will immediately suggest themselves to those skilled in the art, and it is therefore to be distinctly understood that such modifications and variations as do not depart from the spirit of the invention are, although not specifically described herein, contemplated by and within the scope of the appended claims.

Having thus described the invention, what is claimed and desired to be secured by Letters Patent is:

1. In an apparatus for sintering ores having a series of pallets mounted for movement about an endless track having spaced upper and lower reaches, and air ducts extending vertically at one side of the lower reach of the endless track thence angularly to mouths located beneath the upper reach of the track, the combination of a pallet transfer mechanism comprising, a trolley rail having a portion suspended between and substantially parallel with the reaches of said track and a portion extending outwardly beyond said track at the side opposite said air ducts, an ambulatory hoist mounted on said trolley rail, and a brake for retarding the movement of pallets along the lower reach of said endless track.

2. The combination of claim 1 wherein the hoist has two separate sets of lifting devices and the respective sets are independently actuatable and are arranged in spaced relationship lengthwise of the trolley rail so that, when one set of lifting devices is supporting a pallet for placement on said track, the other set of lifting devices is in position to engage a pallet on said track.

3. The combination of claim 1 wherein the hoist is mounted for elevating movement in a direction substantially perpendicular to the lower reach of the track adjacent the portion of the rail which extends between the reaches.

WILLIAM M. DUNCAN.

References Cited in the file of this patent

UNITED STATES PATENTS

| Number | Name | Date |
|---|---|---|
| 448,823 | Nason | Mar. 24, 1891 |
| 1,027,084 | Stehli | May 21, 1912 |
| 1,690,231 | Klugh | Nov. 6, 1928 |
| 1,734,360 | Bittman | Nov. 5, 1929 |
| 1,764,100 | Hoodless | June 17, 1930 |
| 1,800,571 | Shallock | Apr. 14, 1931 |
| 1,828,232 | Rowe | Oct. 20, 1931 |
| 1,836,176 | Kencke | Dec. 15, 1931 |
| 2,304,381 | Shallock et al. | Dec. 8, 1942 |
| 2,389,289 | Armington | Nov. 20, 1945 |
| 2,534,186 | Urban | Dec. 12, 1950 |